United States Patent [19]
Luthi

[11] Patent Number: 5,143,578
[45] Date of Patent: Sep. 1, 1992

[54] METHOD FOR ENGRAVING SOLID ARTICLES WITH LASER BEAMS

[75] Inventor: Pierre Luthi, Mornex, France

[73] Assignee: Union Carbide Coatings Service Technology Corporation, Danbury, Conn.

[21] Appl. No.: 563,611

[22] Filed: Aug. 7, 1990

[51] Int. Cl.⁵ ............................................. B44C 1/00
[52] U.S. Cl. ................................. 156/643; 156/272.8; 156/645; 156/663; 156/905; 219/121.68
[58] Field of Search ............... 156/643, 645, 663, 905, 156/277.8, 667; 219/121.6, 121.76, 121.68, 121.78, 121.69

[56] References Cited

U.S. PATENT DOCUMENTS

| | | | |
|---|---|---|---|
| 4,108,659 | 8/1978 | Dini | 96/36.3 |
| 4,379,818 | 4/1983 | Lock et al. | 430/5 |
| 4,504,354 | 3/1985 | George et al. | 156/639 |
| 4,566,938 | 1/1986 | Jenkins et al. | 156/643 |

Primary Examiner—Steven Weinstein
Assistant Examiner—Anthony Weier
Attorney, Agent, or Firm—Cornelius F. O'Brien

[57] ABSTRACT

A method for engraving a series of consecutive cells in a solid surface, such as a liquid transfer surface, by impinging on the surface a pulsed laser beam in which the pulses of the laser beam are formed in a series of consecutive groups of two or more consecutive pulses and each of said groups form an individual cell in the solid surface. The article produced is also described.

9 Claims, 4 Drawing Sheets

METHOD FOR ENGRAVING SOLID ARTICLES WITH LASER BEAMS

FIELD OF THE INVENTION

The present invention relates to the engraving of solid surfaces, such as ceramic and metal carbide surfaces, with pulsed laser beams in which the laser beams are formed in a series of consecutive groups, each group containing two or more consecutive pulses to form an individual cell in the solid surface.

BACKGROUND OF THE INVENTION

Liquid transfer articles such as plates and rolls may be printing plates or rolls or may be metering plates or rolls used in offset printing, flexography or gravure, or plates and rolls used to apply liquid such as ink, lacquer or liquid resin to surfaces to be coated with such liquids. In all cases the liquid or ink to be transferred is held in a plurality of cells engraved in the surface of the plate or roll with the amount of liquid to be transferred depending on the number, size and depth of the cells per unit area of the engraved surface. In practice, the cells are formed close together in a definite pattern of parallel lines of cells. In the case of a cylinder they are formed in a continuous spiral on the cylindrical surface. While the engraved surface can be in the form of a plate, by far the most common and usual form is that of a cylinder having a continuous spiral of cells engraved on its surface. The spiral of cells is engraved so that a plurality of parallel lines of cells are produced all forming the same angle (usually called the screen angle) with a surface line parallel to the longitudinal axis of the cylinder or roll, which angle may be 0°–90°, for example, 30° or 60° but more commonly 45°.

While a variety of engraved surfaces are used for transferring liquid, ceramic and metal carbide surfaces, because of their extreme hardness and consequent excellent wear resistance, are generally used for liquid transfer. Because of their hardness, however, the only practical method of engraving such surfaces is by means of a laser beam. Although continuous laser beams are used for engraving some surfaces, the pulsed laser beam is much more commonly employed as it lends itself to the production of discreet cells in the engraved surface.

In the conventional method each pulse of the laser beam produces one cell. In producing the cell, however, the pulse also produces a raised portion (i.e. above the original surface of the roll) called "recast" around the periphery of each cell which is generally annular in shape but of irregular width and height. For reasons which will be more fully explained hereinafter the recast makes it impossible by conventional methods to reduce the distance between cells along the spiral engraving line to less than about twice that along a line perpendicular to the longitudinal axis of the cylindrical roll. The recast may be partially or entirely eliminated by polishing of the engraved roll.

Because of the irregularity in the height of the recast, movement of liquid between adjacent cells is possible if no after polishing or insufficient polishing to reduce the recast to flat lands between the cells is undertaken. When it is possible for liquid to pass between adjacent cells this type of structure is termed "an open cell structure". When sufficient polishing is effected to produce flat lands of recast of the same height above the original surface or to the original surface itself, then the cells become closed as the movement of liquid between them is no longer possible.

The general form of the cells in conventional engraving is substantially conical. This creates a problem in that ink or other liquid tends to dry out in the bottom of the cells which, over a period of time, reduces the liquid holding capacity of the engraved roll overall. Also, because the onset and degree of the drying out varies from cell to cell unevenness can result in the transfer of liquid from different parts of the roll. This necessitates periodic cleaning of the engraved rolls which has been found to be time consuming and expensive.

Increasing the depth of the cells by conventional pulsed laser beam techniques with the object of increasing the liquid holding capacity of an engraved roll is self-defeating since the drying out effect places a limit on the depth which can in practice be realized for any given diameter of cell without that effect occurring. Thus if the ratio of diameter/depth is less than 3 times, this drying out problem can occur. For any given diameter of cell beyond a certain depth, the deeper the depth, the more the drying out effect will occur. Also the conical shape of the cells does not lend itself to complete transfer of liquid from the cells when the cells are beyond a certain depth, that depth depending on the diameter of the cells. In practice therefore, increasing the depth of the cells does not really provide an effective increase in the holding capacity or transfer capacity of a roll. If the cells are not thoroughly cleaned, mixtures of different inks and solvents are formed in the cell bottom which can lead to hard deposits being formed. The deeper the cells, the more difficult it becomes to effect thorough cleaning, and the more likely that such deposits will be formed. This offsets any temporary advantage which is achieved by an increased depth of cell in terms of holding capacity or transfer capacity.

Where an open cell structure is employed it is not so important to have all cells equidistant from each other in all directions. Such an open cell structure has advantages when the rolls are themselves printing rolls and are being used to produce substantial areas of block printing of uniform colors. It is disadvantageous when the roll is essentially being used as an ink transfer roll to the screen dot structure on a printing roll. Particularly, when small dots are involved, an open cell structure would enable ink to flow from adjacent cells not actually in contact with the surface of a particular dot into the cells which are in contact with the dot, resulting in an excessive application of ink. This problem is even greater with large size cells in the engraved roll than with small cells. With large cells the amount of ink which can be transferred from cells adjacent but not in contact with the surface of a particular dot would be substantial in the sense that the cells themselves would hold more ink and the number of cells in contact with a particular dot would be relatively small in number. Proportionately therefore, there would be a greater excess of ink under these circumstances than there would be if the cells were very small.

With an open cell structure therefore difficulties would be experienced by a printer in those areas which produced light shades of color since the dots in these regions of the printing roll would be small. If on the other hand a closed cell structure were used, there would be no intrinsic problem since there would be no transfer of ink from adjacent cells into those cells in contact with any particular dot on the printing roll.

Where the printer is required to print both intense colors and very pale shades at the same time the problem becomes acute. If an open cell structure is used with large cells this would enhance the intensity of the deep shades but would create problems in the pale shades. Reducing the size of the cells would reduce the problem in the lighter shaded areas but because of the lower ink holding capacity of a roll with fine or small diameter cells the maximum intensity of color which could be achieved is limited.

As indicated, the use of a closed cell structure would enable larger cells to be used which would have a greater ink transfer capacity to produce the desirable deep shades while having no intrinsic problems in the lighter shaded areas. However, a closed cell structure produced by conventional means would not have the cells spaced from each other equally in all directions and this would itself create problems in the evenness of printing particularly in the deep shaded areas.

Because of the drying out effect mentioned above increasing the depth of individual cells would not in general increase the ink transfer capacity since although this would initially increase to some extent the transfer of ink, it would generally not continue for very long at the initial level once the ink started to dry in the bottom of the conically shaped cell.

It is therefore an object of the present invention to provide a method of engraving using a pulsed laser beam which enables the cells to be formed substantially equidistant from one another in all directions and at the same time have a greater volume without increasing the depth.

It is another object of the present invention to provide a method of producing pulsed laser beams that can impart a pattern of laser engraved cells to a liquid transfer article in which the cells are substantially equidistance apart.

It is another object of the present invention to provide a method for imparting pulsed laser engraved cells in a liquid transfer article in which the cells have an increased volume and are spaced relatively close together.

It is another object of the present invention to produce spaced-apart cells in a liquid transfer article in which each cell is formed from at least two consecutive spaced-apart laser pulses.

It is another object of the present invention to provide a liquid transfer article having a plurality of spaced-apart cells in which each cell is substantially equidistant from each of its adjacent cells.

The above and further objects and advantages of this invention will become apparent upon consideration of the following description thereof.

SUMMARY OF THE INVENTION

The invention relates to a method for engraving a series of consecutive cells in a solid surface by impingement on the solid surface a pulsed laser beam in relative motion with said surface and wherein the pulses of the laser beam are formed in a series of consecutive groups with each group comprising two or more consecutive spaced-apart pulses and the impingement of each group of pulses on said solid surface forming an individual cell in said solid article.

In the preferred embodiment of this invention, the cells would be formed in a series of substantially parallel vertical rows with each cell in one row being offset so that it is horizontally aligned substantially between two adjacent cells in an adjacent row. In this type of arrangement, each cell can be substantially equidistant from each of its adjacent cells. The preferred arrangement would be to have a line connecting the center axis of a cell in one row with the center axis of an adjacent cell in adjacent row from an angle of about 45° with a horizontal line passing through the row of cells.

The invention also relates to a solid article, such as a liquid transfer article, having on at least a portion of its surface a plurality of spaced-apart laser engraved cells each cell defining a substantially oval opening in the surface of the article and defined by a major diameter and minor diameter passing through a central axial point, said cells aligned in at least two rows in which a line drawn through the major diameter of the cells in one row is parallel to a line drawn through the major diameter of the cell in an adjacent row; at least a portion of the cells in one row each having its minor diameter axis aligned between the minor diameter axis of two spaced-apart cells in an adjacent row; and preferably wherein the distance of the non-engraved spacing between two cells in a row along a line containing their major diameter axis is substantially equal to the distance of the non-engraved space between one of said adjacent cells and a cell in an adjacent row along a line containing the center axis points of the cells. In accordance with the invention, the length of the non-engraved spacing between two cells in a row along a line containing their major diameter axis should be equal to or no more than 2 times the length of the non-engraved space between one of said adjacent cells and a cell in an adjacent row along a line containing the center axis points of the cells, and preferably the length should be equal to or no more than 1.3 times the length.

The preferred method of the present invention enables adjacent cells to be spaced substantially equidistance from each other in a liquid transfer article and thereby enables a substantially closed cell structure to be achieved. Furthermore, because the cross-section of the cells produced by the method of the invention differs from that produced by conventional techniques in that the sides of the cells have a steeper gradient for a given depth of cell, the cells produced according to the present invention have a greater volume than those produced by conventional techniques. Also the bottom surface of a cell produced by the method of the invention is flatter than that of a cell produced by conventional single pulse engraved techniques. These differences enable a higher liquid holding capacity to be achieved and therefore a higher liquid transfer capacity without increasing the depth of the cells.

Furthermore, the shape of the cross-section of the cells produced according to the invention lends itself more easily to cleaning techniques so that thorough cleaning of the cells is more likely to be achieved by the cleaning techniques currently in use. The shape of the cross-section of the cells produced according to the invention also enables a more efficient transfer of liquid therefrom and less likelihood of liquid being left in the bottom of the cells after transfer and therefore renders the problem of drying out of liquid in the cells described above less likely to occur.

It is generally advisable to use a higher amplitude for the first and second pulses at the boundaries of the printing surface in order to produce an adequate gradient in the edges of the printing surfaces. In the conventional process each laser pulse and the relative movement of laser beam to the surface to be engraved is arranged so that each such cell is aligned with the next adjacent cell both in the direction of motion of the laser beam and lateral thereto. Because of the conical shape of the individual cells the gradient of the edges of the printing areas is not sufficiently steep and the amplitude of the first and second pulses is increased to increase the depth of the initial cells produced by the pulses and thereby achieve a substantially right-angle edge to the printing surface.

By using the technique of the present invention and forming each of the cells which form the edges of the printing area with a group of two or more consecutive spaced-apart pulses, the contour of the individual cells is changed and a satisfactory edge to the printing areas can be achieved without increasing the amplitude of the laser pulses. In practice all the cells can be produced using the technique of the present invention thus obviating the necessity to alter the frequency of the laser beam at the edges of the printing area.

In accordance with another embodiment of the present invention a method is provided of engraving a solid surface to produce a print roll by impingement on preselected areas of the solid surface a pulsed laser beam in relative motion with the surface to produce unengraved printing areas and engraved non-printing areas in said surface, the pulsed laser beam producing a series of consecutive overlapping cells in the engraved areas of said solid surface characterized in that at least the individual cells which form the edges of the unengraved printing areas are each formed by impinging a group of two or more pulses of the laser beam. Preferably all the cells in the engraved non-printing areas can be produced by a group of two or more consecutive pulses.

A wide variety of laser machines are available for forming cells in articles such as ceramic or metallic carbide coatings In general, lasers capable of producing a beam or pulse of radiation of from 0.0001 to 0.4 joule per laser pulse for a duration of 10 to 300 microseconds can be used. The laser pulses can be separated by 30 to 2000 microseconds depending on the specific pattern of cell desired. Higher or lower values of the energy and time periods can be employed and other laser-engraved techniques readily available in the art can be used for this invention.

Although the invention is ideally suited for use in engraving ceramic and metal carbide surfaces disposed on cylinders or rolls, it should be understood that the invention could also be used on other surfaces and to flat as well as cylindrical surfaces. Preferably for liquid transfer rolls, the rolls could comprise an aluminum or steel substrate coated with any material which can be pulse laser engraved. Suitable ceramic coatings, such as refractory oxide or metallic carbide coating, may be applied to the surface of the roll. For example, tungsten carbide-cobalt, tungsten carbide-nickel, tungsten carbide-cobalt chromium, tungsten carbide-nickel chromium, chromium-nickel, aluminum oxide, chromium carbide-nickel chromium, chromium carbide-cobalt chromium, tungsten-titanium carbide-nickel, cobalt alloys, oxide dispersion in cobalt alloys, aluminum-titania, copper based alloys, chromium based alloys, chromium oxide, chromium oxide plus aluminum oxide, titanium oxide, titanium plus aluminum oxide, iron based alloys, oxide dispersed in iron based alloys, nickel and nickel based alloys, and the like may be used. Preferably chromium oxide ($Cr_2O_3$), aluminum oxide ($Al_2O_3$), silicon oxide or mixtures thereof could be used as the coating material, with chromium oxide being the most preferred.

The preferred or metallic carbide coatings can be applied to the metal surface of the roll by either of two well known techniques; namely, the detonation gun process or the plasma coating process. The detonation gun process is well known and fully described in U.S. Pat. Nos. 2,714,563; 4,173,685; and 4,519,840, the disclosures of which are hereby incorporated by reference. Conventional plasma techniques for coating a substrate are described in U.S. Pat. Nos. 3,016,447; 3,914,573; 3,958,097; 4,173,685; and 4,519,840, the disclosures of which are incorporated herein by reference. The thickness of the coating applied by either the plasma process or the detonation gun process can range from 0.5 to 100 mils and the roughness ranges from about 50 to about 1000 $R_a$ depending on the process, i.e. detonation gun or plasma, the type of coating material, and the thickness of the coating.

The ceramic or metallic carbide coating on the roll can be preferably treated with a suitable pore sealant such as an epoxy sealant, e.g., UCAR 100 epoxy available from Union Carbide Corporation (UCAR is a trademark of Union Carbide Corporation). The treatment seals the pores to prevent moisture or other corrosive materials from penetrating through the ceramic or metallic carbide coating to attack and degrade the underlying steel structure of the roll.

BRIEF DESCRIPTION OF THE DRAWINGS

Referring to the drawings, FIG. 1 shows the general configuration and shape of cells 2 produced by conventional techniques. A typical cell 2 is generally conical shaped with the bottom of the cell 4 occupying only a small area relative to the surface area of the cell. For convenience, the surface in which the cells are formed is shown as flat although this would not be so unless polishing of the surface had been performed to remove the recast. In contrast, the cells 6 of the invention are basin shaped as shown in FIG. 2 in which the bottom 8 of the cells extend over a substantial area not much reduced from the area of the cell in the plane of the surface, and the bottoms 8 are relatively flat in comparison with the bottoms 4 of cells 2 in FIG. 1. The groups of cells of FIGS. 1 and 2 are respectively shown in idealized plan form in FIGS. 3 and 4 of the drawings, respectively, with each cell having a major axis "x" and minor axis "y" intersection at control axis part 3. In both FIGS. 3 and 4 the cells would be formed consecutively along a line substantially at right angles to the longitudinal axis of the roll with the distance 'a' being the non-engraved distance between consecutive cells in a row and the distance 'b' being the non-engraved distance between adjacent cells along a screen line drawing through the center axis point 3 of adjacent cells in an adjacent row. In FIG. 3, a≃2b whereas in FIG. 4, a≃b. FIGS. 3a and 3b are cross-sections of the conventional cells 2 produced by a single pulse showing the recast 10 being formed around the periphery of each cell 2. If the distance 'a' in FIG. 3, is reduced to that of 'b' of FIG. 3, then the recast formed when cell 2 is formed will push the recast already surrounding an adjacent edge of a performed cell 2 into the adjacent cell. FIGS. 4a and 4b are cross-sections of the typical cell 6 of FIG. 2 and FIG. 4 showing each cell 6 with a major axis "x" and minor axis "y" intersecting at center axis point 5 as shown in FIG. 4. Despite the fact that the distances "a" and "b" between adjacent cells are approximately the same, the recast formation 12, as shown in FIGS. 4a and 4b, would not encroach on an adjacent cell. This arises from the multiple pulse used to form each of the cells in FIG. 4. The shape of the cross-section of the cells 2 shown in FIGS. 3a and 3b are clearly different from the cross-section of the cells 6 shown in FIGS. 4a and 4b.

Referring to FIGS. 5, 6 and 7, the theoretical circle of impingement of each laser pulse in the group of pulses used to form an individual cell is shown. In FIG. 5 two pulses are used to form a cell, in FIG. 6 three pulses are used to form a cell, and in FIG. 7 four pulses are used to form the cell.

EXAMPLE 1

A 215 millimeter diameter steel gravure roll was coated with a 0.012 inch layer of chromium oxide ($Cr_2O_3$). A laser machine using $CO_2$ was employed to produce pulses of radiation which were directed onto the coated layer. The laser was adjusted so that 2 pulses were used to produce an individual cell in the coated layer. The laser used had the following parameters:

| | |
|---|---|
| Frequency | 19902 Hz |
| Individual pulse width | 35 US |
| RF amplitude | 4.6 volts |
| Average power | 44 watts |
| Energy per pulse | 44 mj (millijoules) |
| Focal length | 2.5 inches |
| Beam collinator expender | 4 times |

The pulses of radiation from the laser were all of uniform energy and therefore produced a plurality of uniform cells in the coated surface. Each cell was produced using 2 consecutive spaced-apart pulses, the cells were disposed on the roll in parallel rows and had a screen angle of 45°.

Figure 1:
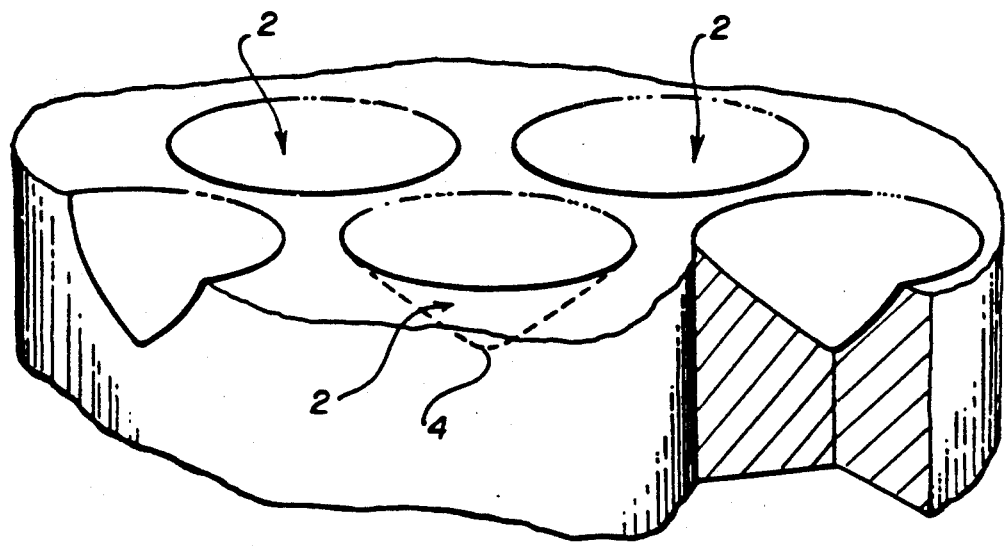
FIG. 1 is an identified enlarged perspective view, part cut away, showing a group of adjacent cells produced by a conventional pulsed laser technique.
Figure 2:
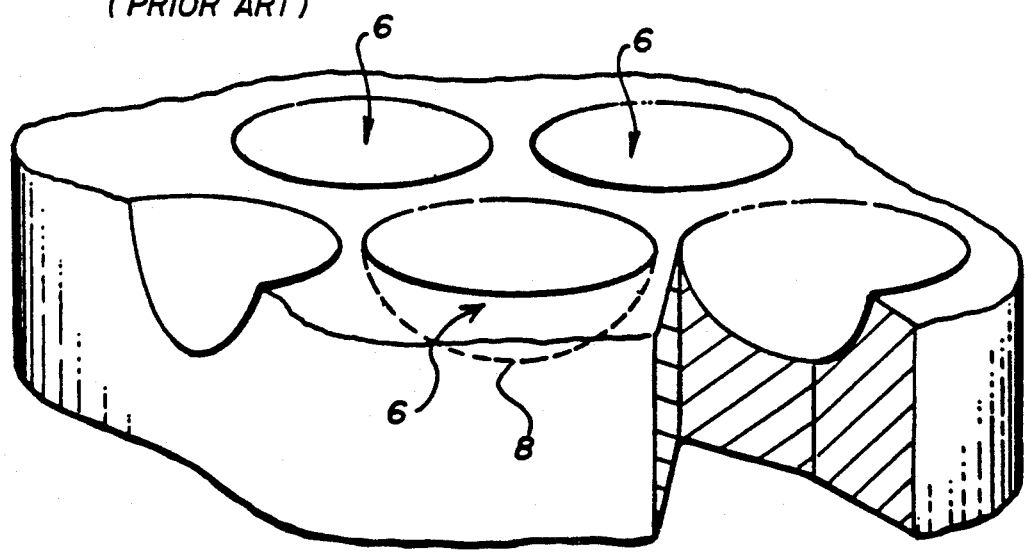
FIG. 2 is an idealized enlarged perspective view, part cut away, of a group of adjacent cells produced by the method of the invention.
Figure 3:
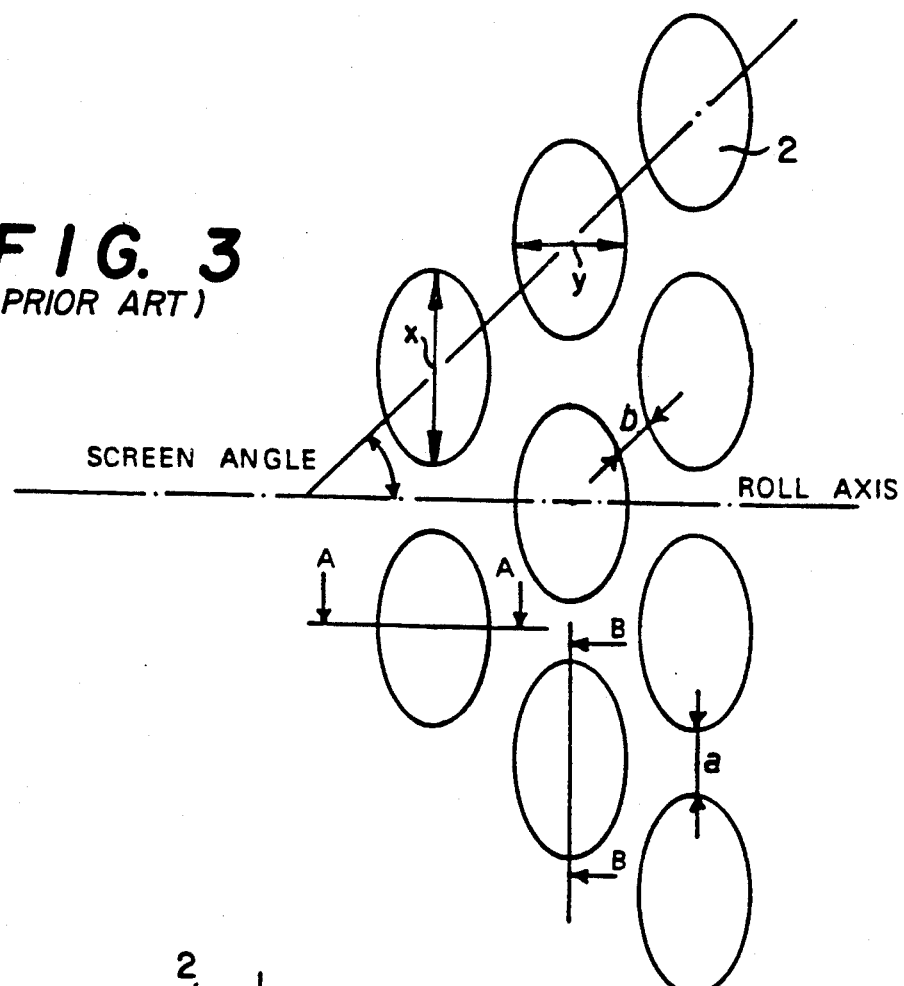
FIG. 3 is a diagrammatic enlarged plan view of a group of cells produced by conventional techniques.
Figure 3A:
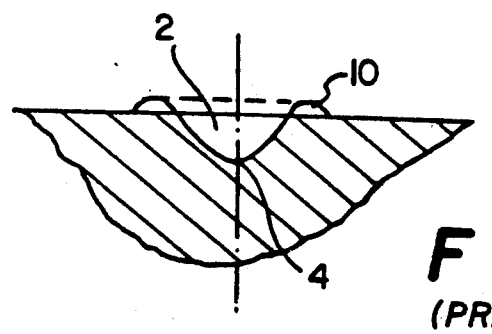
FIG. 3a is a cross-section view taken through line A—A in FIG. 3.
Figure 3B:
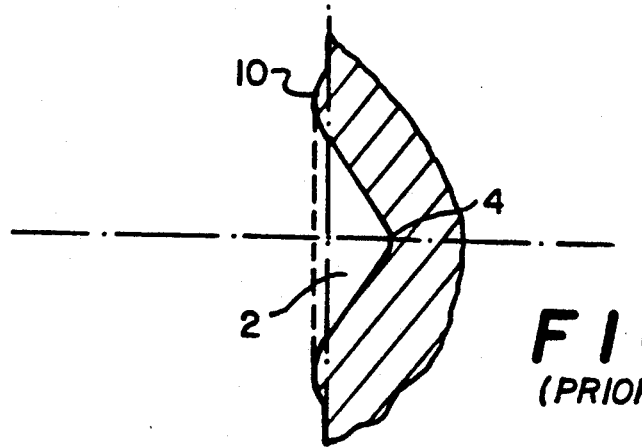
FIG. 3b is a cross-section view taken through line B—B in FIG. 3.
Figure 4:
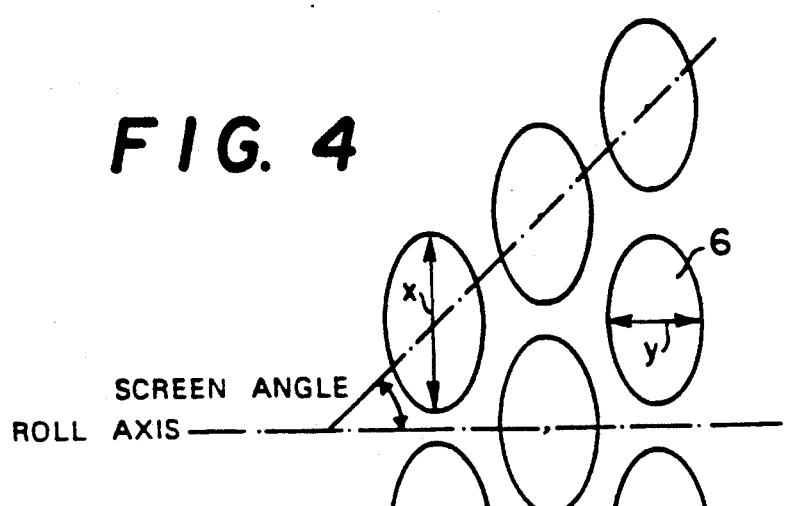
FIG. 4 is a diagramatic enlarged plan view of a group of cells produced by the method of this invention.
Figure 4A:
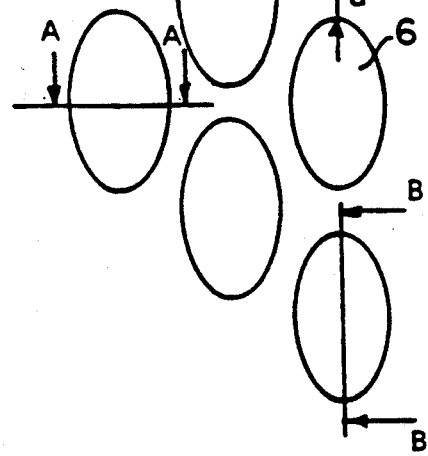
FIG. 4a is a cross-section view taken through line A—A in FIG. 4.
Figure 4A:
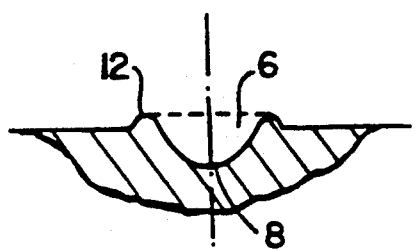
Figure 4B:
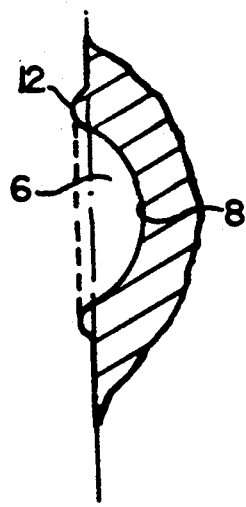
FIG. 4b is a cross-section view taken through line B—B in FIG. 4.
Figure 6:
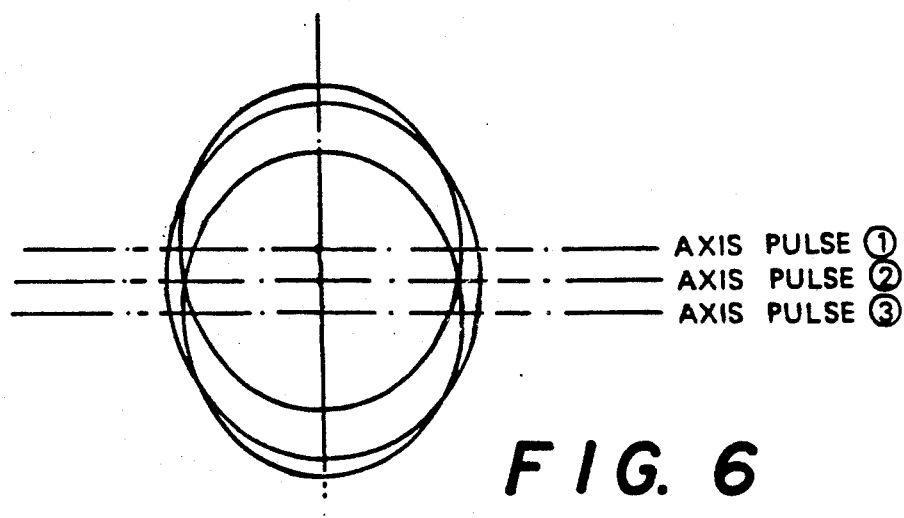
FIG. 6 is a plan view of a cell produced by a group of three consecutive spaced-apart pulses.
Figure 7:
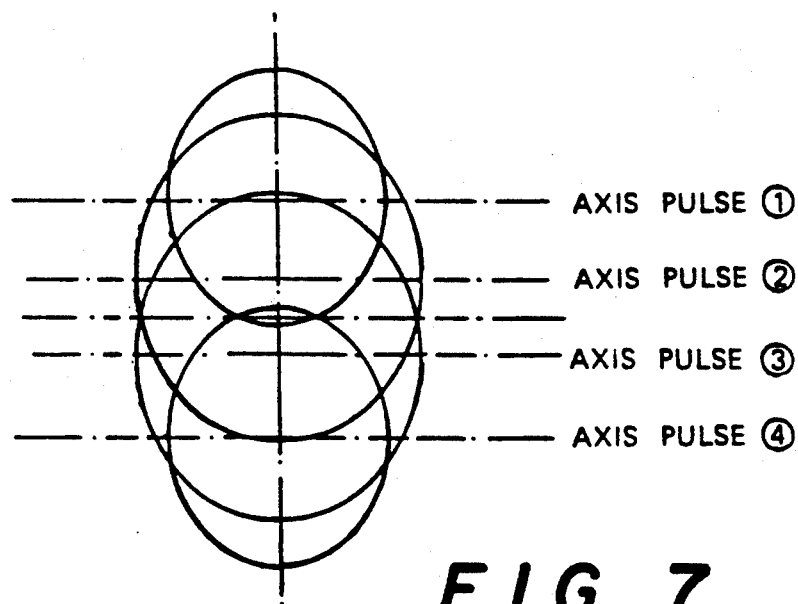
FIG. 7 is a plan view of a cell produced by a group of four consecutive spaced-apart pulses.
Figure 5:
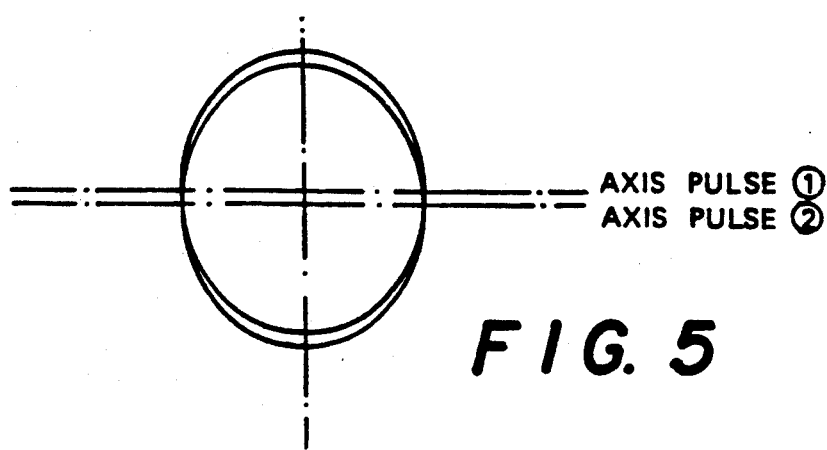
FIG. 5 is a plan view of a cell produced by a group of two consecutive spaced-apart pulses showing the centers of the individual pulses which form the cell.

After finishing the cells, each cell had a major diameter of about 0.082 millimeter, a minor diameter of 0.060 millimeter and a cell depth of approximately 0.013 millimeters. The cells were arranged as shown in FIG. 4 and the distance "a" was measured as 0.015 millimeter and the distance "b" was measured as 0.012 millimeter. An inspection of the cells revealed that they were all of substantial equal volume and that each cell was substantially equidistant from each of its adjacent cells. Thus the engraved cells had increased volume for depth size and increased cell density over conventional laser engraved cells produced using a single pulse beam for each cell.

EXAMPLE 2

A 143 millimeter diameter steel gravure roll was coated with a 0.012 inch layer of chromium oxide ($Cr_2O_3$). A laser machine using $CO_2$ was employed to produce pulses of radiation which were directed onto the coated layer. The laser was adjusted so that 4 pulses were used to produce an individual cell in the coated layer. The laser used had the following parameters:

| | |
|---|---|
| Frequency | 5,478 Hz |
| Pulse width | 45 US |
| Current | 50 milliamperes |
| Average power | 25 watts |
| Energy per pulse | 8.2 mj (millijoules) |
| Focal length | 2.5 inches |
| Beam collinator expender | 2 times |

The pulses of radiation from the laser were all of uniform energy and therefore produced a plurality of uniform cells in the coated surface. Each cell was produced using 4 consecutive spaced-apart pulses, the cells were disposed on the roll in parallel rows and had a screen ample of 45°.

Each cell had a major diameter of about 0.208 millimeter, a minor diameter of about 0.126 millimeter and a cell depth of approximately 0.080 millimeters. The cells were arranged as shown in FIG. 4 and the distance "a" was measured as 0.024 millimeter and the distance "b" was measured as 0.019 millimeter. An inspection of the cells revealed that they were all of substantial equal volume and that each cell was substantially equidistant from each of its adjacent cells. Thus the engraved cells had increased volume for depth size and increased cell density over conventional laser engraved cells using a single pulse beam for each cell.

EXAMPLE 3

A 143 millimeter diameter steel gravure roll was coated with a 0.012 inch layer of chromium oxide ($Cr_2O_3$) A laser machine using $CO_2$ was employed to produce pulses of radiation which were directed onto the coated layer. The laser was adjusted so that 2 pulses were used to produce an individual cell in the coated layer. The laser used had the following parameters:

| | |
|---|---|
| Frequency | 5,488 Hz |
| Pulse width | 60 US |
| Current | 35 milliamperes |
| Average power | 14 watts |
| Energy per pulse | 5.1 mj (millijoules) |
| Focal length | 2.5 inches |
| Beam collinator expender | 2 times |

The pulses of radiation from the laser were all of uniform energy and therefore produced a plurality of uniform cells in the coated surface. Each cell was produced using 2 consecutive spaced-apart pulses, the cells were disposed on the roll in parallel rows and had a screen ample of 60°.

Each cell had a major diameter of about 0.156 millimeter, a minor diameter of about 0.127 millimeter and a cell depth of approximately 0.090 millimeters. The cells were arranged as generally shown in FIG. 4 and the distance "a" was measured as 0.026 millimeter and the distance "b" was measured as 0.026 millimeter. An inspection of the cells revealed that they were all of substantial equal volume and that each cell was substantially equidistant from each of its adjacent cells. Thus the engraved cells had increased volume for depth size and increased cell density over conventional laser engraved cells produced using a single pulse beam for each cell.

As many possible embodiments may be made by this invention without departing from the scope thereof, it being understood that all matter set forth is to be interpreted as illustrative and not in a limiting sense. For example, this invention could be used to produce liquid transfer articles that could be used to impart patterns of liquid or adhesives to paper, cloth, films, wood, steel and the like.

What is claimed:

1. A method for engraving a series of consecutive cells in at least a portion of a solid surface of a liquid transfer roll by impinging on the solid surface a pulsed laser beam in relative motion with said surface and wherein the pulses of the laser beam are formed in a series of consecutive groups with each group comprising two or more consecutive spaced-apart and non-concentric pulses and wherein each group impinging said solid surfaces forms an individual cell in said solid surface with each cell being a basin shaped cell having a substantially oval opening with a major diameter axis and a minor diameter axis intersecting at a center axis point of the cell; said cells are formed and aligned in the surface of the roll in substantially parallel rows perpendicular to the longitudinal axis of the roll, and a line drawn through the center axis point of a cell in a row and the central axis point of an adjacent cell in an adjacent row forms an angle of between 0° and 60° with a line drawn parallel to the longitudinal axis of the roll.

2. The method of claim 1 wherein the angle is between 30° and 60°.

3. The method of claim 2 wherein the angle is about 45°.

4. The method of claim 3 wherein the cells are formed and aligned in the liquid transfer roll in substantially parallel rows perpendicular to the longitudinal axis of the roll and positioned such that a length of the non-engraved spaced between two cells in a row along a line containing their major diameter axis is between 1 and 1.3 times the length of the non-engraved space between one of said adjacent cells and a cell in an adjacent row along a line containing the center axis point of the cells.

5. The method of claim 4 wherein the length of the non-engraved spacing between the two cells is a row along a line containing their major diameter axis is substantially equal to the length of the non-engraved space between one of said adjacent cells and a cell in an adjacent row along a line containing the center axis point of the cells.

6. The method of claim 1 wherein the cells are formed substantially equal distance from each other.

7. The method of claim 1 wherein at least a portion of said groups comprises two pulses.

8. The method of claim 1 wherein at least a portion of said groups comprises three pulses.

9. The method of claim 1 wherein at least a portion of said groups comprising four pulses.

* * * * *